United States Patent
Kim

(10) Patent No.: US 10,871,128 B2
(45) Date of Patent: Dec. 22, 2020

(54) WATER INJECTOR CONTROL METHOD FOR IMMEDIATE WATER INJECTION AND ENGINE DRIVEN BY METHOD

(71) Applicant: HYUNDAI AUTRON CO., LTD., Seoul (KR)

(72) Inventor: Young-Jae Kim, Gunpo-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 30 days.

(21) Appl. No.: 16/197,664

(22) Filed: Nov. 21, 2018

(65) Prior Publication Data

US 2019/0186420 A1    Jun. 20, 2019

(30) Foreign Application Priority Data

Dec. 14, 2017    (KR) .................. 10-2017-0172231

(51) Int. Cl.
*F02M 25/022* (2006.01)
*F02M 25/028* (2006.01)
*F02B 47/02* (2006.01)

(52) U.S. Cl.
CPC ......... *F02M 25/0227* (2013.01); *F02B 47/02* (2013.01); *F02M 25/028* (2013.01); *F02M 25/0222* (2013.01)

(58) Field of Classification Search
CPC ........... F02M 25/0227; F02M 25/0222; F02M 25/028; F02M 25/03; F02B 47/02; F01N 3/04; F01N 11/002; F02D 41/0025; F02D 41/3082

See application file for complete search history.

(56) References Cited

U.S. PATENT DOCUMENTS

| | | | |
|---|---|---|---|
| 8,375,934 B2 * | 2/2013 | Zheng | F24S 10/90 126/588 |
| 2005/0034463 A1 * | 2/2005 | Simpson | F02C 3/30 60/775 |
| 2011/0200461 A1 * | 8/2011 | Christensen | F04B 17/05 417/300 |

(Continued)

FOREIGN PATENT DOCUMENTS

| | | | |
|---|---|---|---|
| CN | 204043164 U | * | 12/2014 |
| JP | 2012225319 A | | 11/2012 |

(Continued)

*Primary Examiner* — Jacob M Amick
*Assistant Examiner* — Charles Brauch
(74) *Attorney, Agent, or Firm* — Baker & Hostetler LLP; Hyunho Park

(57) ABSTRACT

Disclosed herein are a method of controlling a water injector for immediate water injection and an engine driven by the method. A method of controlling an operation of a water injector for injecting water into the combustion chamber of an engine to which a turbo system for increasing the amount of air by pressing air has been applied includes detecting water pressure applied to a water supply pipe for supplying water to the water injector, stopping an operation of a water supply pump when the detected data reaches a preset reference value, detecting a temperature of water within the water supply pipe for supplying the water to the water injector, and returning the water within the water supply pipe to a water storage tank and driving the water supply pump to supplying new water to the water supply pipe when the detected data deviates from a preset range.

10 Claims, 5 Drawing Sheets

(56) References Cited

U.S. PATENT DOCUMENTS

2016/0304182 A1* 10/2016 Park .................... B63J 4/002

FOREIGN PATENT DOCUMENTS

| KR | 1020000024235 A | 5/2000 |
| KR | 1020030016705 A | 3/2003 |
| KR | 1020050037045 A | 4/2005 |
| KR | 1020050107827 A | 11/2005 |
| KR | 1020170045724 A | 4/2017 |
| KR | 10-2017-0056195 A | 5/2017 |
| WO | 2016177558 A1 | 11/2016 |

* cited by examiner

WATER INJECTOR CONTROL METHOD FOR IMMEDIATE WATER INJECTION AND ENGINE DRIVEN BY METHOD

CROSS REFERENCE TO RELATED APPLICATION

The present application claims the benefit of Korean Patent Application No. 10-2017-0172231 filed in the Korean Intellectual Property Office on Dec. 14, 2017, the entire contents of which are incorporated herein by reference.

BACKGROUND OF THE INVENTION

1. Technical Field

The present invention relates to a method of controlling a water injector and an engine driven by the method and, more particularly, to a method of controlling a water injector for immediate water injection and an engine driven by the method.

2. Description of the Related Art

In a conventional technology, a water injector capable of injecting water into the combustion chamber of an engine is mounted on an engine to control the temperature of waste gas or to improve a combustion characteristic within the combustion chamber of the engine, thereby preventing an unstable operation, such as knocking, and eventually improving efficiency of the engine.

In the conventional technology, however, if water remains in a water supply pipe for supplying the water to the water injector more than a given time, an efficient cooling effect cannot be implemented because the temperature of the water rises.

Furthermore, if water pressure in the water supply pipe for supplying water to the water injector does not reach a specific level, an intended cooling effect cannot be achieved because immediate water injection cannot be performed.

Accordingly, there is a need for a technology capable of solving the above-described problems of the conventional technology.

PRIOR ART DOCUMENT

Patent Document (Patent Document 0001) Korean Patent Application Publication No. 10-2017-0056195 (May 23, 2017)

SUMMARY OF THE INVENTION

An object of the present invention is to provide a method of controlling a water injector, which can perform an immediate waterjet operation and inject water maintained within a preset temperature range by effectively controlling the operation of a water injection pump, and an engine driven by the method.

A method of controlling a water injector according to an aspect of the present invention is a method of controlling an operation of a water injector for injecting water into the combustion chamber of an engine to which a turbo system for increasing the amount of air by pressing air has been applied. The method may include a water pressure detection step of detecting water pressure applied to a water supply pipe for supplying water to the water injector, a pump stop step of stopping an operation of a water supply pump when the data detected in the water pressure detection step reaches a preset reference value, a water temperature detection step of detecting a temperature of water within the water supply pipe for supplying the water to the water injector, and a water replacement step of returning the water within the water supply pipe to a water storage tank and driving the water supply pump to supply new water to the water supply pipe when the data detected in the water temperature detection step deviates from a preset range.

In an embodiment of the present invention, the method further includes a stop time calculation step of calculating the stop time of the water supply pump stopped in the pump stop step. When the stop time of the water supply pump deviates from a preset range, the water replacement step of returning the water within the water supply pipe to the water storage tank and driving the water supply pump to supply the new water to the water supply pipe may be performed.

In an embodiment of the present invention, the water temperature detection step may include further detecting a modeling temperature of each of the engine and a manifold. When the detected modeling temperature of each of the engine and the manifold deviates from a preset range, the water replacement step of returning the water within the water supply pipe to the water storage tank and driving the water supply pump to supply the new water to the water supply pipe may be performed.

In an embodiment of the present invention, the method further includes a water injection execution step of driving the water injector by providing water within the water supply pipe to the water injector when the data detected in the water temperature detection step satisfies a preset range condition.

In an embodiment of the present invention, in the water temperature detection step, the temperature of the water within the water supply pipe may be measured in real time.

According to an embodiment of the present invention, there is provided an engine driven by the method of controlling a water injector. The engine according to an aspect of the present invention may have a configuration, including a detection unit configured to detect water pressure applied to a water supply pipe and a temperature of the water within the water supply pipe and to transmit the detected data to a controller, and the controller configured to stop an operation of a water supply pump when the data detected by the detection unit reaches a preset reference value and to control an operation of the water supply pump so that the water within the water supply pipe is returned to a water storage tank and a water supply pump is driven to supply new water to the water supply pipe when a temperature of the water deviates from a preset range.

In an embodiment of the present invention, the controller may calculate the stop time of the water supply pump. When the stop time of the water supply pump deviates from a preset range, the controller may return the water within the water supply pipe to the water storage tank and drive the water supply pump to supply the new water to the water supply pipe.

In an embodiment of the present invention, the detection unit may further detect a modeling temperature of each of the engine and a manifold. When the detected modeling temperature of each of the engine and the manifold deviate from a preset range, the controller may return the water within the water supply pipe to the water storage tank and drive the water supply pump to supply the new water to the water supply pipe.

In an embodiment of the present invention, the controller may drive a water injector by supplying the water within the water supply pipe to the water injector when the data detected by the detection unit satisfies a preset range condition.

In an embodiment of the present invention, the detection unit may measure a temperature of the water within the water supply pipe.

<Description of reference numerals>

| | |
|---|---|
| 100: engine | 101: combustion chamber |
| 102: water injector | 103: waste gate |
| 104: turbine | 105: compressor |
| 106: water supply pipe | 107: water recovery pipe |
| 108: water supply pump | 109: water storage tank |
| 110: detection unit | 120: controller |
| 130: memory | |
| S100: method of controlling water injector | |
| S110: water pressure detection step | |
| S120: pump stop step | |
| S125: stop time calculation step | |
| S130: water temperature detection step | |
| S140: water replacement step | |
| S150: water injection execution step | |
| S100: method of controlling a water injector | |
| S110: water pressure detection step | |
| S120: pump stop step | |
| S125: stop time calculation step | |
| S130: water temperature detection step | |
| S140: water replacement step | |
| S150: water injection execution step | |

DETAILED DESCRIPTION

Hereinafter, embodiments of the present invention are described in detail with reference to the accompanying drawings. Terms or words used in the specification and claims should not be construed as having common or dictionary meanings, but should be construed as having meanings and concepts that comply with the technical spirit of the present invention.

In the entire specification, when it is described that one member is positioned "on" or "over" the other member, it means that one member may adjoin the other member and a third member may be interposed between the two members. In the entire specification, unless explicitly described to the contrary, the word "include, have, or comprise" will be understood to imply the inclusion of stated elements but not the exclusion of any other elements.

Figure 1:
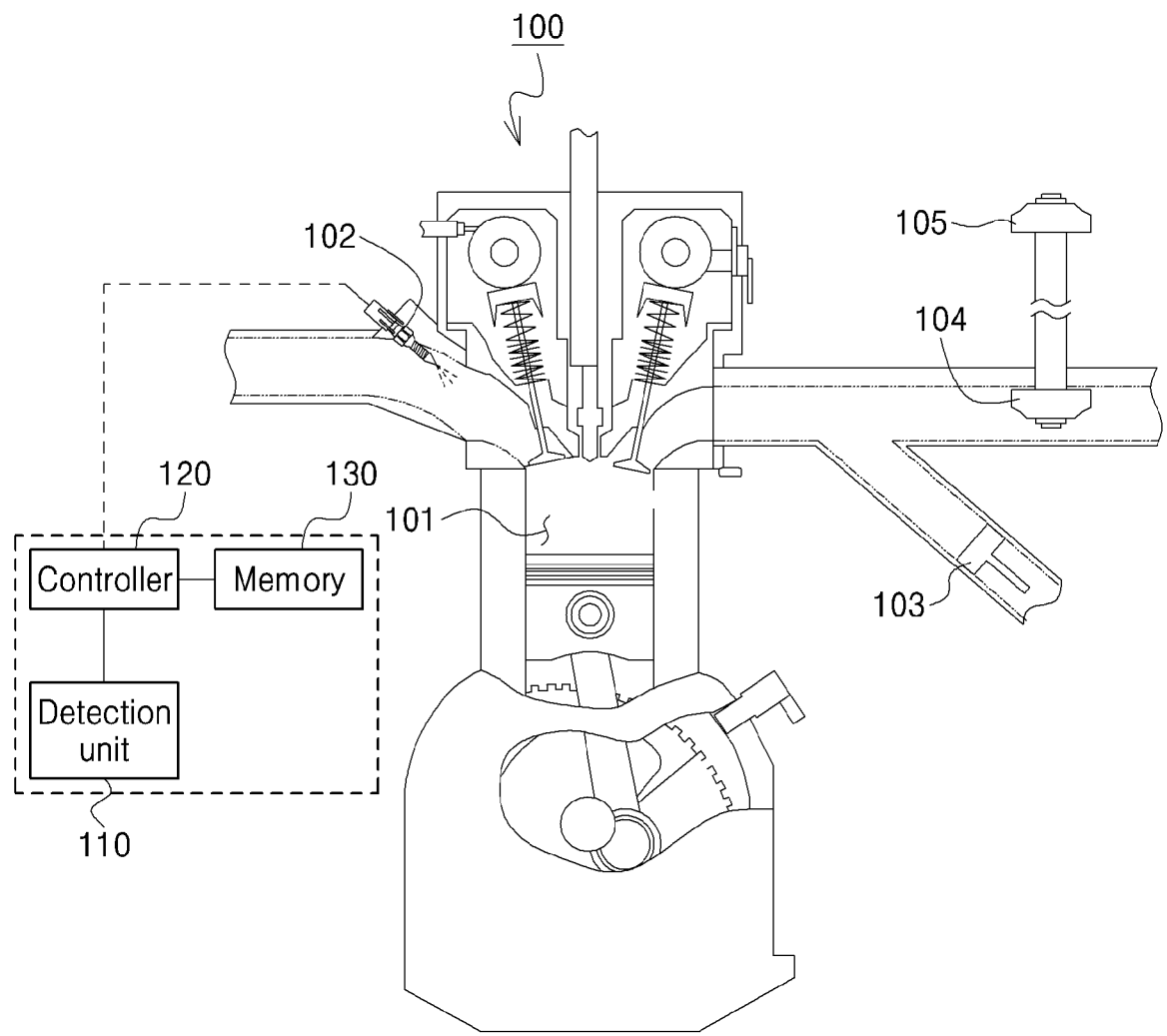
FIG. 1 shows the configuration of an engine including a water injector according to an embodiment of the present invention.
Figure 2:
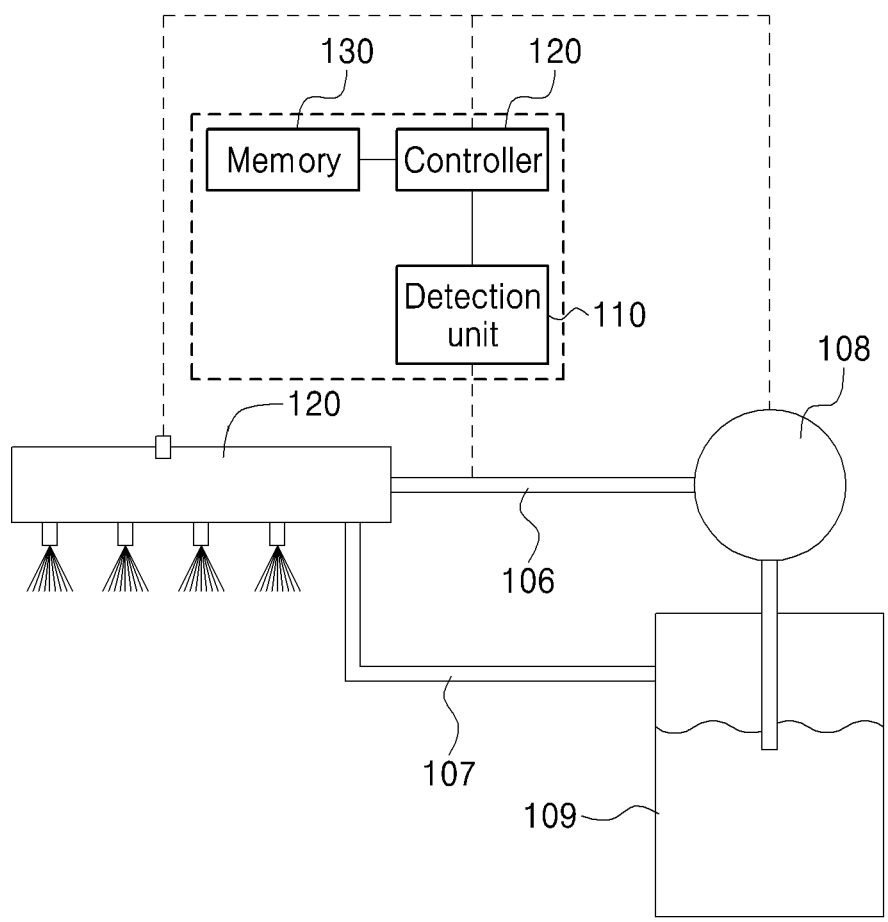
FIG. 2 shows the configuration of part of the engine including the water injector according to an embodiment of the present invention.
Figure 3:
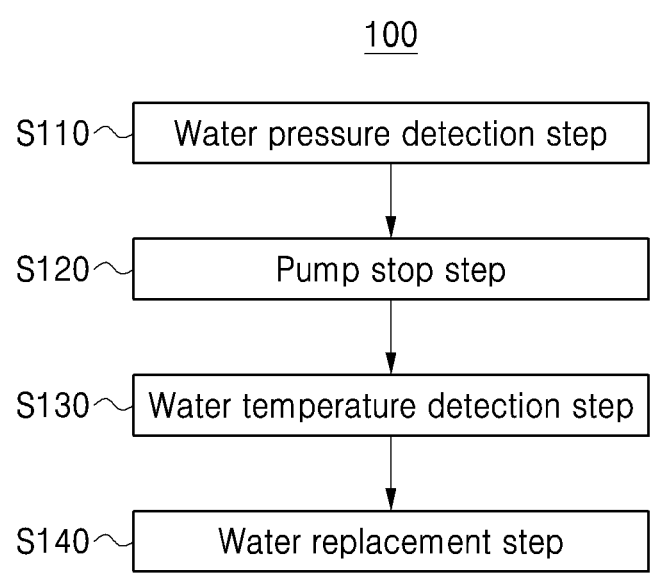
FIG. 3 is a flowchart showing a method of controlling a water injector according to an embodiment of the present invention.

FIGS. 1 and 2 show the configuration of part of an engine including a water injector according to an embodiment of the present invention. FIG. 3 is a flowchart showing a method of controlling a water injector according to an embodiment of the present invention.

Referring to FIGS. 1 and 2, the method S100 of controlling a water injector according to the present embodiment is a method of controlling the operation of an injector for injecting water into the combustion chamber of an engine to which a turbo system for increasing the amount of air by compressing air has been applied.

As shown in FIG. 3, the method S100 of controlling a water injector according to the present embodiment includes a water pressure detection step S110, a pump stop step S120, a water temperature detection step S130 and a water replacement step S140. Accordingly, there is provided the method of controlling a water injector capable of performing an immediate waterjet operation and injecting water maintained within a preset temperature range by effectively controlling the operation of a water injection pump, and an engine driven by the method.

Hereinafter, elements forming the method S100 of controlling a water injector according to the present embodiment are described in detail with reference to the accompanying drawings.

Figure 4:
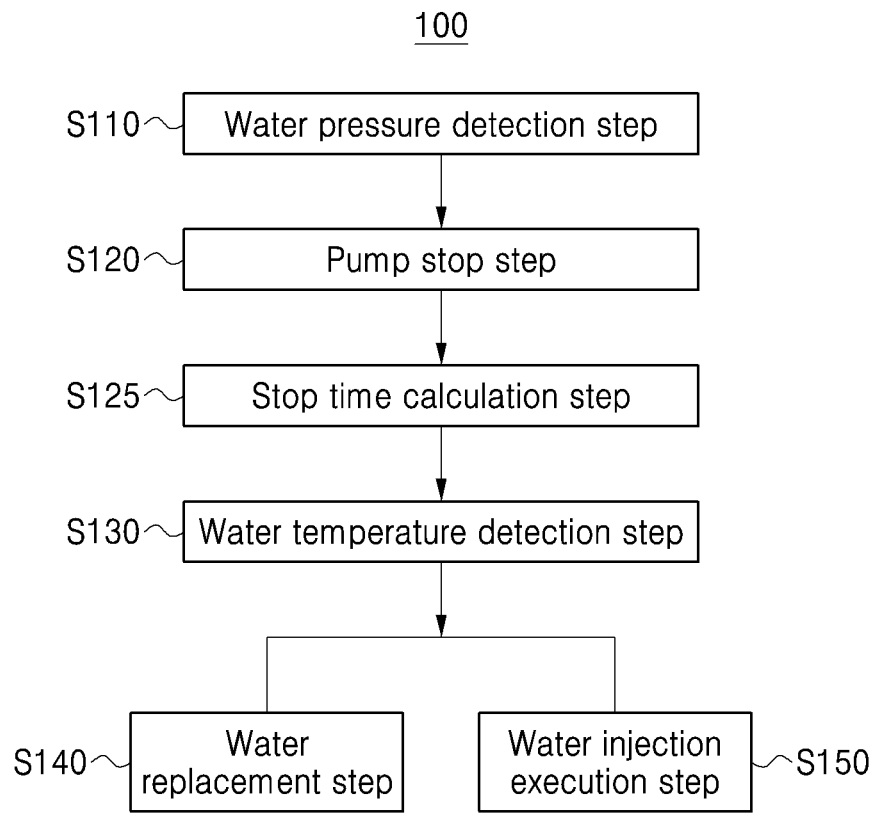
FIG. 4 is a flowchart showing a method of controlling a water injector according to another embodiment of the present invention.
Figure 5:
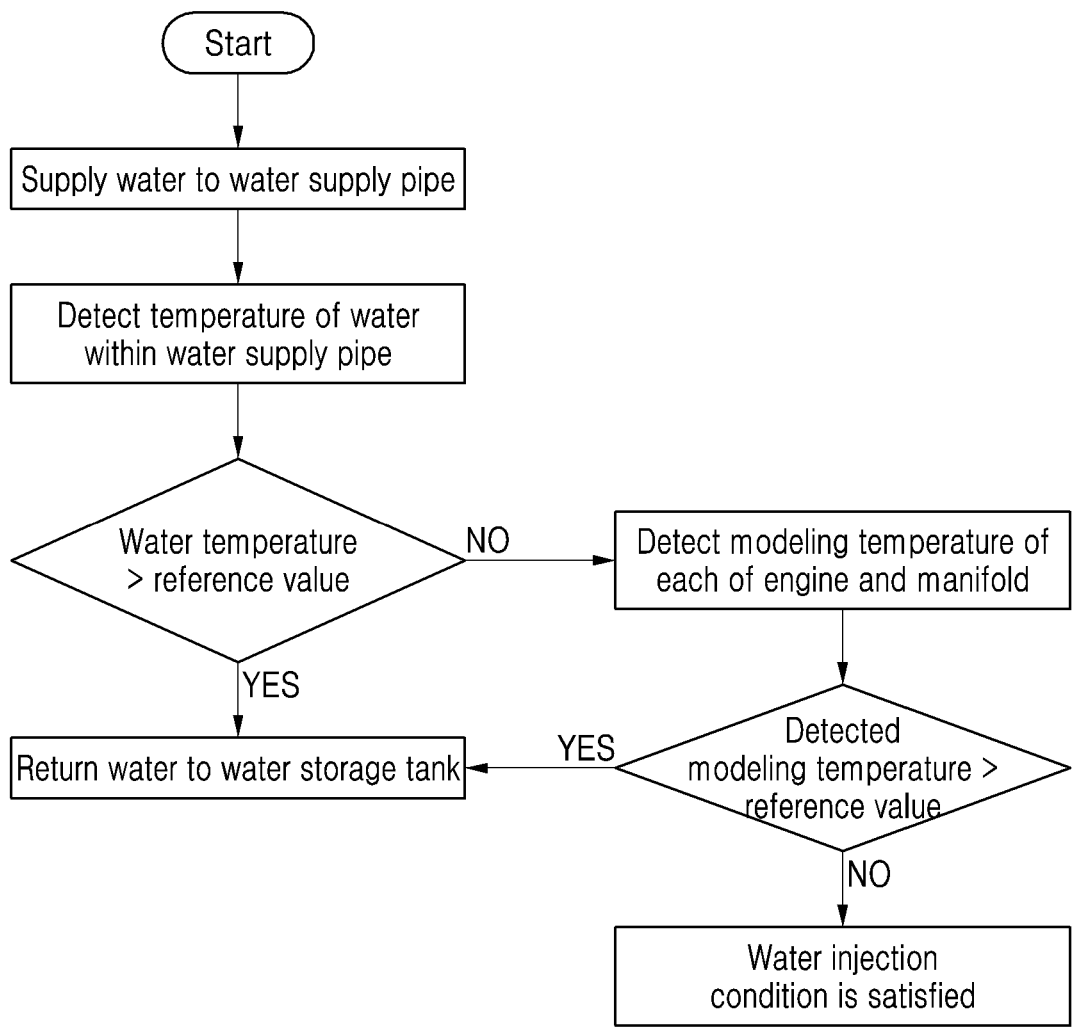
FIG. 5 is a flowchart showing a method of controlling a water injector according to an embodiment of the present invention.

FIG. 4 is a flowchart showing a method of controlling a water injector according to another embodiment of the present invention. FIG. 5 is a flowchart showing a method of controlling a water injector according to an embodiment of the present invention.

Referring to FIGS. 4 and 5, in the water pressure detection step S110 according to the present embodiment, water pressure applied to a water supply pipe for supplying water to a water injector is detected.

In the pump stop step S120, when data detected in the water pressure detection step reaches a preset reference value, the operation of a water supply pump is stopped.

Accordingly, in accordance with the present embodiment, when data detected in the water pressure detection step S110 reaches a preset reference value, the operation of the water supply pump is stopped. Accordingly, water pressure applied to the water supply pipe is maintained within a specific range, and immediate water injection can be implemented.

In some embodiments, a stop time calculation step S125 of calculating the stop time of the water supply pump stopped in the pump stop step S120 may be performed. In this case, when the stop time of the water supply pump deviates from a preset range, a water replacement step S140 of returning water within the water supply pipe to a water storage tank and driving the water supply pump to supply new water to the water supply pipe may be performed.

In the water temperature detection step S130, the temperature of water within the water supply pipe for supplying water to the water injector is detected. In this case, the temperature of the water within the water supply pipe is measured in real time.

Accordingly, in accordance with the present embodiment, when the temperature of water within the water supply pipe for supplying water to the water injector deviates from a preset temperature range, the water within the water supply pipe is returned to the water storage tank and the water supply pump is driven to supply new water to the water supply pipe, thereby being capable of injecting water maintained within the preset temperature range.

In some embodiments, in the water temperature detection step S130, the modeling temperature of each of the engine and a manifold may be further detected. In this case, when the detected modeling temperature of each of the engine and the manifold deviates from a preset range, the water replacement step S140 of returning water within the water supply pipe to the water storage tank and driving the water supply pump to supply new water to the water supply pipe may be performed.

In the water replacement step S140, when data detected in the water temperature detection step deviates from a preset range, water within the water supply pipe may be returned to the water storage tank, and the water supply pump may be driven to supply new water to the water supply pipe.

In some embodiments, as shown in FIG. 4, when data detected in the water temperature detection step satisfies a preset range condition, a water injection execution step S150 of driving the water injector by supplying water within the water supply pipe to the water injector may be performed.

Furthermore, the present invention may provide the engine 100 driven by the method S100 of controlling a water injector. The engine 100 according to the present embodiment may have a configuration, including a detection unit 110, a controller 120 and memory 130 configured to perform given roles as shown in FIGS. 1 and 2.

Specifically, the detection unit 110 detects water pressure applied to the water supply pipe and the temperature of water within the water supply pipe and then transmits the detected data to the controller. In this case, the detection unit 110 may measure the temperature of the water within the water supply pipe 106 in real time.

The controller 120 according to the present embodiment stops the operation of the water supply pump 108 when the data detected by the detection unit 110 reaches a preset reference value. Thereafter, when the temperature of the water deviates from a preset range, the controller 120 may control the operation of the water supply pump 108 so that the water within the water supply pipe 106 is returned to the water storage tank 109 and the water supply pump 108 is driven to supply new water to the water supply pipe 106.

In some embodiments, the controller 120 may calculate the stop time of the water supply pump 108. When the stop time of the water supply pump 108 deviates from a preset range, the controller may return the water within the water supply pipe 106 to the water storage tank 109 and drive the water supply pump 108 to supply new water to the water supply pipe 106.

Furthermore, the detection unit 110 further detects the modeling temperature of each of the engine and the manifold. When the detected modeling temperature of each of the engine and the manifold deviates from a preset range, the controller 120 may return the water within the water supply pipe 106 to the water storage tank 109 and drive the water supply pump 108 to supply new water to the water supply pipe 106.

In some embodiments, when the data detected by the detection unit 110 satisfies the preset range condition, the controller 120 may drive the water injector 102 by supplying the water within the water supply pipe 106 to the water injector 102.

Accordingly, in accordance with the present embodiment, the engine includes the detection unit 110 and the controller 120 configured to perform given roles. Accordingly, the engine can perform an immediate waterjet operation and inject water maintained within a preset temperature range.

The memory 130 according to the present embodiment is a generic term of a space or storage area in which data input and output when a given program code for controlling an overall operation of the engine 100 and an operation based on the program code are performed is stored. The memory may have a form, such as electrically erasable and programmable read only memory (EEPROM), flash memory (FM) or a hard disk drive.

For example, the memory 130 may store a preset water pressure reference value, a water temperature reference value, etc., and may store water pressure applied to the water supply pipe value as an experimentally determined value.

The method S100 of controlling a water injector according to an embodiment of the present invention may be fabricated as a program to be executed in a computer and stored in a computer-readable recording medium. The computer-readable recording medium may include ROM, RAM, CD-ROM, a magnetic tape, a floppy disk, and an optical data storage device, for example. Furthermore, the computer-readable recording medium includes a form of carrier waves (e.g., transmission through the Internet).

The computer-readable recording medium may be distributed to computer systems connected over a network, and code readable by a computer may be stored and executed in the computer systems in a distributed manner. Furthermore, a functional program, code and code segments for implementing the method may be easily reasoned by programmers in the field to which the embodiments belong.

As described above, the method of controlling a water injector according to an embodiment of the present invention includes the water pressure detection step, pump stop step, water temperature detection step and water replacement step. Accordingly, there can be provided the method of controlling a water injector, which can perform an immediate waterjet operation and inject water maintained within a preset temperature range by effectively controlling the operation of the water injection pump, and the engine driven by the method.

Furthermore, in accordance with the method of controlling a water injector according to an embodiment of the present invention, when data detected in the water pressure detection step reaches a preset reference value, the operation of the water supply pump is stopped. Accordingly, water pressure applied to the water supply pipe can be maintained within a specific range, and immediate water injection can be implemented.

Furthermore, in accordance with the method of controlling a water injector according to an embodiment of the present invention, when the temperature of water within the water supply pipe for supplying water to the water injector deviates from a preset temperature range, the water within the water supply pipe is returned to the water storage tank and the water supply pump is driven to supply new water to the water supply pipe. Accordingly, water maintained within a preset temperature range can be injected.

Furthermore, in accordance with the method of controlling a water injector according to an embodiment of the present invention, the modeling temperature of each of the engine and the manifold is further detected. When the detected modeling temperature of each of the engine and the manifold deviates from a preset range, water within the water supply pipe is returned to the water storage tank and the water replacement step of supplying new water to the water supply pipe by driving the water supply pump is performed. Accordingly, water maintained within a preset temperature range can be injected.

Furthermore, in accordance with the method of controlling a water injector according to an embodiment of the present invention, the temperature of water within the water supply pipe is measured in real time, and water maintained within a preset temperature range can be injected.

Furthermore, in accordance with the engine driven by the method of controlling a water injector according to an embodiment of the present invention, there can be provided the engine including the detection unit and controller configured to perform given roles and thus capable of performing an immediate waterjet operation and injecting water maintained within a preset temperature range.

In the detailed description of the present invention, only some special embodiments of the present invention have been described. It is however to be understood that the present invention is not limited to the special embodiments described in the detailed description, but should be construed as including all of changes, equivalents and substitutes without departing from the spirit and range of the present invention defined by the appended claims.

That is, the present invention is not limited to the above-described specific embodiments and description and may be modified in various ways by a person having ordinary skill in the art to which the present invention pertains without departing from the gist of the present invention written in the claims. Such modifications or changes fall in the range of protection of the present invention.

What is claimed is:

1. A method of controlling an operation of a water injector for injecting water into a combustion chamber of an engine to which a turbo system for increasing an amount of air by pressing air has been applied, the method comprising:
   a water pressure detection step of detecting water pressure applied to a water supply pipe for supplying water to the water injector;
   a pump stop step of stopping an operation of a water supply pump when the data detected in the water pressure detection step reaches a preset reference value;
   a stop time calculation step of calculating a stop time of the water supply pump stopped in the pump stop step;
   a water temperature detection step of detecting a temperature of water within the water supply pipe for supplying the water to the water injector; and
   a water replacement step of returning the water within the water supply pipe to a water storage tank and driving the water supply pump to supplying new water to the water supply pipe when the data detected in the water temperature detection step deviates from a preset range, wherein when the stop time of the water supply pump deviates from a preset range, the water replacement step of returning the water within the water supply pipe to the water storage tank and driving the water supply pump to supply the new water to the water supply pipe is performed.

2. A method of controlling an operation of a water injector for injecting water into a combustion chamber of an engine to which a turbo system for increasing an amount of air by pressing air has been applied, the method comprising:
   a water pressure detection step of detecting water pressure applied to a water supply pipe for supplying water to the water injector;
   a pump stop step of stopping an operation of a water supply pump when the data detected in the water pressure detection step reaches a preset reference value;
   a water temperature detection step of detecting a temperature of water within the water supply pipe for supplying the water to the water injector; and
   a water replacement step of returning the water within the water supply pipe to a water storage tank and driving the water supply pump to supplying new water to the water supply pipe when the data detected in the water temperature detection step deviates from a preset range, wherein
   the water temperature detection step comprises further detecting a modeling temperature of each of the engine and a manifold, and
   when the detected modeling temperature of each of the engine and the manifold deviates from a preset range, the water replacement step of returning the water within the water supply pipe to the water storage tank and driving the water supply pump to supply the new water to the water supply pipe is performed.

3. The method of claim 1, further comprising a water injection execution step of driving the water injector by providing water within the water supply pipe to the water injector when the data detected in the water temperature detection step satisfies a preset range condition.

4. The method of claim 1, wherein in the water temperature detection step, a temperature of the water within the water supply pipe is measured in real time.

5. An engine comprising a water injector for injecting water into a combustion chamber of an engine to which a turbo system has been applied, the engine comprising:
   a detection unit, the detection unit detects water pressure applied to a water supply pipe and a temperature of the water within the water supply pipe and transmits the detected data to a controller, wherein the controller calculates a stop time of the water supply pump, and when the stop time of the water supply pump deviates from a preset range, the controller returns the water within the water supply pipe to the water storage tank and drives the water supply pump to supply the new water to the water supply pipe, and the controller stops an operation of a water supply pump when the data detected by the detection unit reaches a preset reference value and controls an operation of the water supply pump so that the water within the water supply pipe is returned to a water storage tank and the water supply pump is driven to supply new water to the water supply pipe when a temperature of the water deviates from a preset range.

6. The engine of claim 5, wherein:
   the detection unit further detects a modeling temperature of each of the engine and a manifold, and
   when the detected modeling temperature of each of the engine and the manifold deviate from a preset range, the controller returns the water within the water supply pipe to the water storage tank and drives the water supply pump to supply the new water to the water supply pipe.

7. The engine of claim 5, wherein the controller drives a water injector by supplying the water within the water supply pipe to the water injector when the data detected by the detection unit satisfies a preset range condition.

8. The engine of claim 5, wherein the detection unit measures a temperature of the water within the water supply pipe.

9. The method of claim 2, further comprising a water injection execution step of driving the water injector by providing water within the water supply pipe to the water injector when the data detected in the water temperature detection step satisfies a preset range condition.

10. The method of claim 2, wherein in the water temperature detection step, a temperature of the water within the water supply pipe is measured in real time.

* * * * *